United States Patent

Klöcker et al.

[11] 4,108,054
[45] Aug. 22, 1978

[54] SAFETY INTERLOCK DEVICE IN AN ELECTRICALLY DRIVEN HOUSEHOLD MIXING APPARATUS

[75] Inventors: Ingo Klöcker, Ennepetal; Oswald Gibiec, Wuppertal; Paul-Ulrich Uibel, Ennepetal; Dieter Garn, Schwelm, all of Fed. Rep. of Germany

[73] Assignee: Vorwerk & Co Interholding GmbH, Wuppertal, Fed. Rep. of Germany

[21] Appl. No.: 849,966

[22] Filed: Nov. 9, 1977

[30] Foreign Application Priority Data

Nov. 10, 1976 [DE] Fed. Rep. of Germany ....... 2651237

[51] Int. Cl.² .......................... A47J 27/18; B01F 7/16
[52] U.S. Cl. ....................................... 99/348; 366/144
[58] Field of Search ................. 99/348; 366/144, 314, 366/279

[56] References Cited

U.S. PATENT DOCUMENTS

| | | | |
|---|---|---|---|
| 2,648,514 | 8/1953 | Rosier | 99/348 |
| 3,220,450 | 11/1965 | Aronson | 99/348 |
| 3,695,586 | 10/1972 | Griffin | 366/144 |
| 3,924,838 | 12/1975 | Waniishi | 99/348 |

*Primary Examiner*—Robert W. Jenkins

*Attorney, Agent, or Firm*—Michael J. Striker

[57] ABSTRACT

A safety interlock device for an electrically driven household mixing apparatus includes a safety switch operatively connected with electric circuit of a drive motor of the apparatus and of an arrangement for heating a container of the apparatus, a switching rod longitudinally movable between switch-on and switch-off positions causing the switch to move respectively to its on and off positions, a holding lever pivotally mounted on the switching rod for turning between closed and open positions in which its end respectively abuts against a cover of the container and is withdrawn from the same, an arm provided with a temperature sensing element and movable between a proximal and distal positions in which the temperature sensing element respectively contacts a wall of the container and is withdrawn from the same, an actuating lever pivotally movable between a first position in which it keeps the holding lever in the closed position and through the intermediary of the holding lever keeps the switching rod in the switch-on position and a second position in which the actuating lever does not keep these parts in such positions, and a transmission element mounted on the actuating lever and operative when the latter is moved to its first position for moving the arm with the temperature sensing element to its proximal position.

22 Claims, 4 Drawing Figures

SAFETY INTERLOCK DEVICE IN AN ELECTRICALLY DRIVEN HOUSEHOLD MIXING APPARATUS

BACKGROUND OF THE INVENTION

The present invention relates to a safety interlock device for an electrically driven household mixing apparatus. More particularly, it relates to a safety interlock device for a household mixing apparatus which has a housing with an electric motor, a container having a body portion and a removable cover, and a heating device for heating the container.

Mixing apparatuses for household use are known in the art. Such mixing apparatuses have a holding lever turnably mounted on a housing of a motor or on a support. The lever has a free end portion adapted to engage the cover of the container. The free end portion of the holding lever is held on the cover or holds the latter closed. When the lever is turned off and its holding action is terminated, the drive motor will be switched off. In this construction, the holding lever is turnably mounted in the support and is releasably pressed against the cover by means of a tightening bolt provided on the end of the holding lever. Turning of the entire lever actuates a switch which switches off the drive motor. In this case there is a substantial disadvantage that closing of the container involves the tightening of this bolt as a prerequisite (interlock) for operation of the mixer, and thereafter, during opening of the container the lever must be released by untightening of the bolt. Another disadvantage of the above construction is that the drive motor can be again switched on when the cover is not on and the lever approaches the container, inasmuch as the switch of the drive motor is operated solely by turning of the lever. When the cover is open, the instrumentalities are accessible which is, of course dangerous.

Other mixing apparatuses have been proposed wherein a container is closed by a cover provided with raised outer ribs and has a lever axially movable against the action of a spring. The lever extends over the ribs of the cover and urges the latter towards the container. This construction possesses certain disadvantages because the turnable lever is mounted on the container and can operate a safety switch only with substantial difficulties. Furthermore, it has also a great disadvantage in that the turnable lever must be closed exactly in its end position, inasmuch as otherwise it will be withdrawn by the action of the spring and by a resulting force produced on the ribs. It is also necessary to produce the cover of a material which can assure engagement of the end portion of the turntable lever after repeated applications.

SUMMARY OF THE INVENTION

Accordingly, it is an object of the present invention to provide a safety interlock device in a household mixing apparatus which avoids the disadvantages of these prior art devices.

More particularly, it is an object of the present invention to provide a safety interlock device for household mixing apparatus which assures connection of a cover with a container of the apparatus and a connection of the container with a housing of the apparatus in a simple manner and at the same time without play and with substantial rigidity.

Another object of the present invention is to provide a safety interlock device in a household mixing apparatus, which assures that the electric drive motor of the apparatus and the sensing element of a device for heating the container will be brought into operation only when the cover of the container is set on the latter and closed.

In keeping with these objects, and with others which will become apparent hereinafter, one feature of the present invention resides, briefly stated, in that a safety interlock device has a safety switch operatively connected with circuit means of a drive motor and of a heating arrangement, a switching rod mounted for longitudinal movement between switch-on and switch-off positions causing the switch to move respectively to its on or off positions, a holding lever pivotally mounted on the switching rod for turning between closed and open positions in which its end portion respectively presses against the cover of the container of the apparatus or is withdrawn from the cover, an arm provided with a temperature sensing element and movable between proximal and distal positions in which this element respectively contacts a wall of the container and is withdrawn from the same, an actuating lever pivotally movable between a first position in which it keeps the holding lever in the closed position and through the intermediary of the holding lever keeps the switching rod in the switch-on position and a second position in which it does not keep the above parts in these positions, and a transmission element mounted on the actuating lever and operative when the latter is moved to its first position for moving the arm with the temperature sensing element to its proximal position.

The device may have pivot means mounting the actuating lever in the housing for pivotal movement relative to the latter and mounting the holding lever on the switching rod. The actuating lever may be provided with a loose bearing pressing against the holding lever when the actuating lever is in the first position and the holding lever is in the closed position. The switching rod may be movable in the direction of the longitudinal axis of the container and may extend from the pivot means of the holding lever to the switch.

A further feature of the present invention is that the holding lever may form an abutment on its one end and may be provided with an indentation on its opposite end, in which indentation the loose bearing of the actuating lever can be received. The loose bearing may be formed as a roller.

A still further feature of the invention is that the holding lever has a projection in the region of the abutment. A section of the holding lever located above the cover of the container of the mixing apparatus in the closed position may be brought into contact with a wall of the container when the arm is in the proximal position. When an additional container which is not to be heated is set in the apparatus, operation of the heating device may be prevented by providing an additional safety switch so that the arm may be brought in contact with the latter.

Another feature of the invention is that the switching rod extends through a guiding member mounted in the housing, and a spring is located between the guiding member and a stop member in the region of the end of the switching member adjacent to the switch.

Finally, still another feature of the present invention is that the holding lever may abut against an inclined section of the housing when the holding lever is in its open position.

When the safety interlock device is constructed in accordance with the present invention, it provides a play-free and rigid connection of the cover with the container and with the housing in a simple manner. The electrical circuit means of the drive motor of the apparatus and of the heating arrangement may be switched on only when the cover is set on the container and closed.

The novel features which are considered as characteristic for the invention are set forth in particular in the appended claims. The invention itself, however, both as to its construction and its method of operation, together with additional objects and advantages thereof will be best understood from the following description of specific embodiments when read in connection with the accompanying drawings.

DESCRIPTION OF A PREFERRED EMBODIMENT

Figure 1:
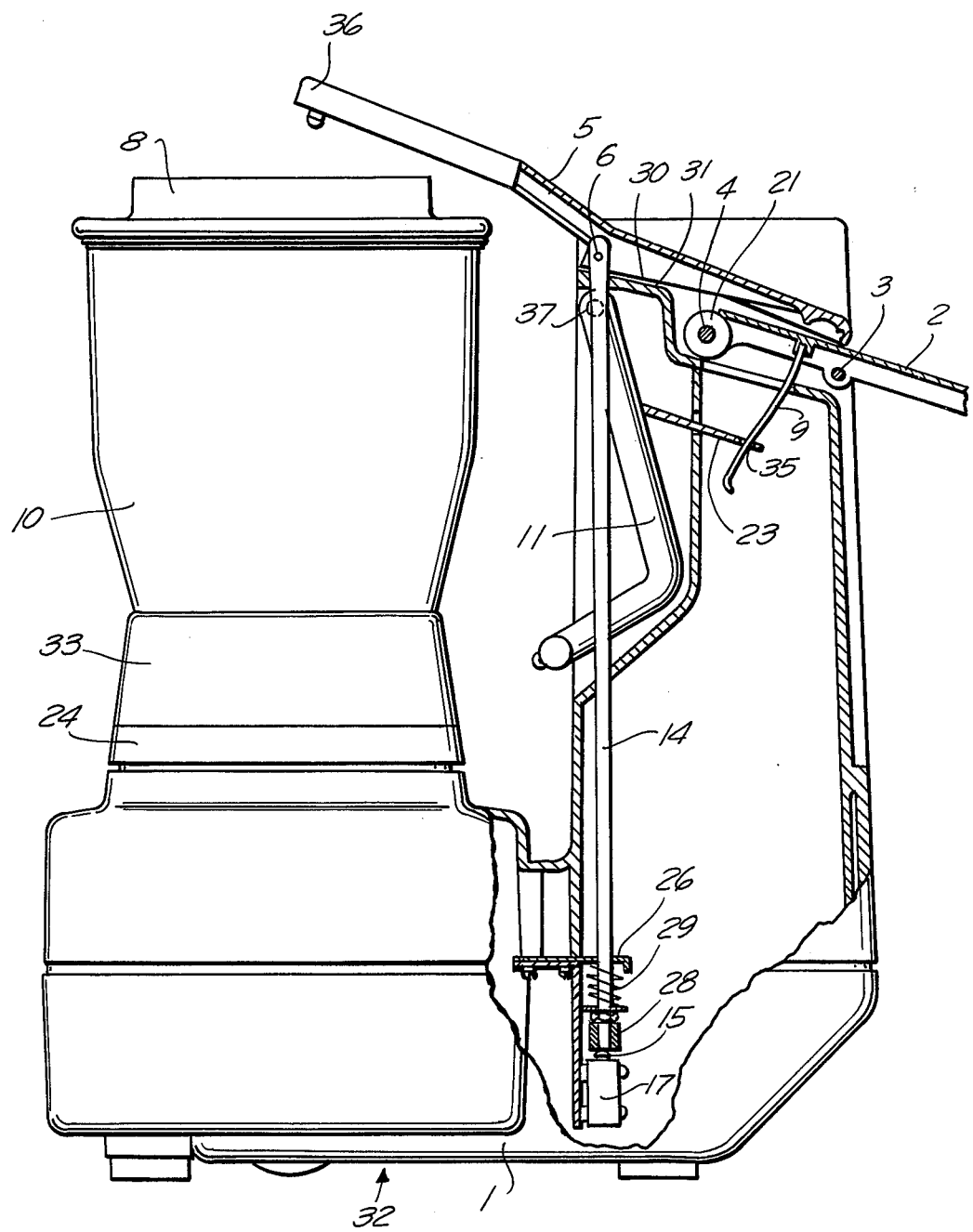
FIG. 1 is a view showing a household mixing apparatus with a heating arrangement, and with a safety interlock device in an open position.

A household mixing apparatus 32 in accordance with the present invention is shown in FIG. 1. The mixing apparatus comprises a housing 1 and a container 10. A heating device 24 carried by the housing 1, is mounted directly on a base portion 33 of the container opposite to the housing 1. Such a heating device is known per se in the art and for this reason is not shown in FIGS. 1 - 3 of the drawing. The housing 1 also carries a drive motor 16 which is also known in the art and not shown in FIGS. 1 - 3. Finally, the housing 1 carries a safety interlock device together with an electrical circuit means for operating the same. The safety interlock device is used for locking the container 10 and also for sensing a temperature of the latter. A construction and a mode of operation of the device will be explained hereinafter.

In an open condition a handle 34 (shown better in FIG. 2) of an actuating lever 2 is turned about a pivot 3 mounted in the housing 1 into a position spaced from the housing 1. Under the action of a spring 29 and a switching bar 14, the holding lever 5 abuts by its portion 30 against an inclined portion 31 of the housing 1. An end portion 36 of the holding lever 5 is turned about a pivot 6 into a position spaced from a cover 8. The cover 8 can be removed from the container 10, and the container 10 can be removed from the housing 1.

The pivot 6 has an axial degree of freedom i.e., it is movable in an axial direction of the container 1. The switching rod 14 extends through a guide member 26 and is connected with the holding lever 5 by the pivot 6. The switching rod 14 urges with its end portion 28 an actuating button 15 of an off-on switch 17 into an off position of the latter and thereby prevents switching on of the drive motor 16. An arm 11 has a guiding member 23 provided with an opening 35 through which a force transmission element 9 extends so that the arm 11 is urged towards the housing 1. The arm 11 is mounted on the housing 1 by means of a pivot 37.

Figure 2:
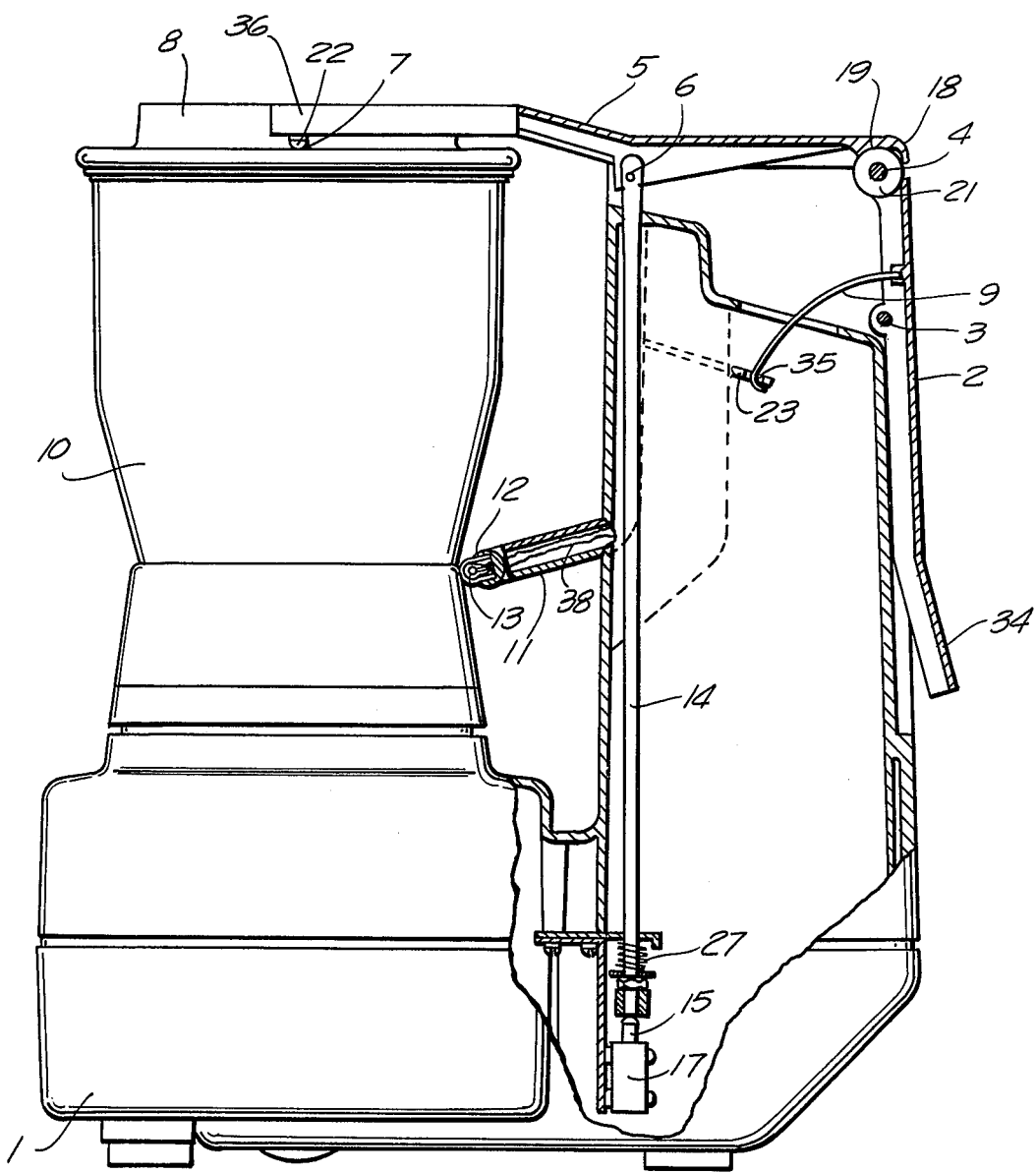
FIG. 2 is a view showing a household mixing apparatus with a heating arrangement, and with a safety interlock device in a closed position.

In order to turn the safety interlock device into a closed position the handle 34 of the actuating lever 2 is moved towards the housing 1 as shown in FIG. 2. The actuating lever 2 turns about the pivot 3 and a roller 21 forming a loose bearing 4 is received in an indentation 19 in holding lever 5. In this case, an end portion 18 of the holding lever 5 turns about the pivot 6, and an opposite end portion 36 of the holding lever 5 abuts against the cover 8. The end portion 36 together with a projection 22 forms an abutment 7. Since the fixed pivot 6 has a degree of freedom in the axial direction, it is shifted vertically against force of the spring 29 by supporting on the abutment 7 and simultaneously lifting at the end portion 18. Therefore, the end portion 36 of the holding lever 5 abuts under the force of the spring 29 against the cover 8 and is safely held in this position.

The switching rod 14 is urged vertically upwardly and releases the actuating button 15 of the off-on switch 17, and thereby the drive motor 16 can be manually switched on. When the cover is not present, the holding lever 5 cannot move axially about the abutment 7 on the pivot 6, and the switching rod 14 will not release the actuating button 15. Thus, switching on of the drive motor 16 is not possible in this case. In order to obtain a more uniformly distributed application of holding or pressing force, the portion of holding lever 5 located above the cover 8 can be forked so that the abutment 7 is formed at two opposite sides of the cover 8.

By turning the actuating lever 2 about the pivot 3, the force transmission element 9 moves through the opening 35 of the guiding member 23 so that the latter is urged against the force transmission element 9 and guided by the latter, and the arm 11 is urged towards the container 10. During this action the force transmission element 9 is urged into an end position by contact with the container 10. A temperature sensing element 13 is located in a tip 12 of the arm 11. A negative temperature coefficient efficient resistor may be used as such a temperature sensing element. The latter is connected by a wire 38 with an electric control element 41 (shown in FIG. 4) which is operatively connected with the heating device 24. It is to be understood that an exact temperature control of a substance accommodated in the bowl 10 is performed only in the case when the arm 11 abuts with its tip 12 against a section of the container 10. In this position, it is possible to sense variations of temperature of the substance accommodated in the bowl.

Figure 3:
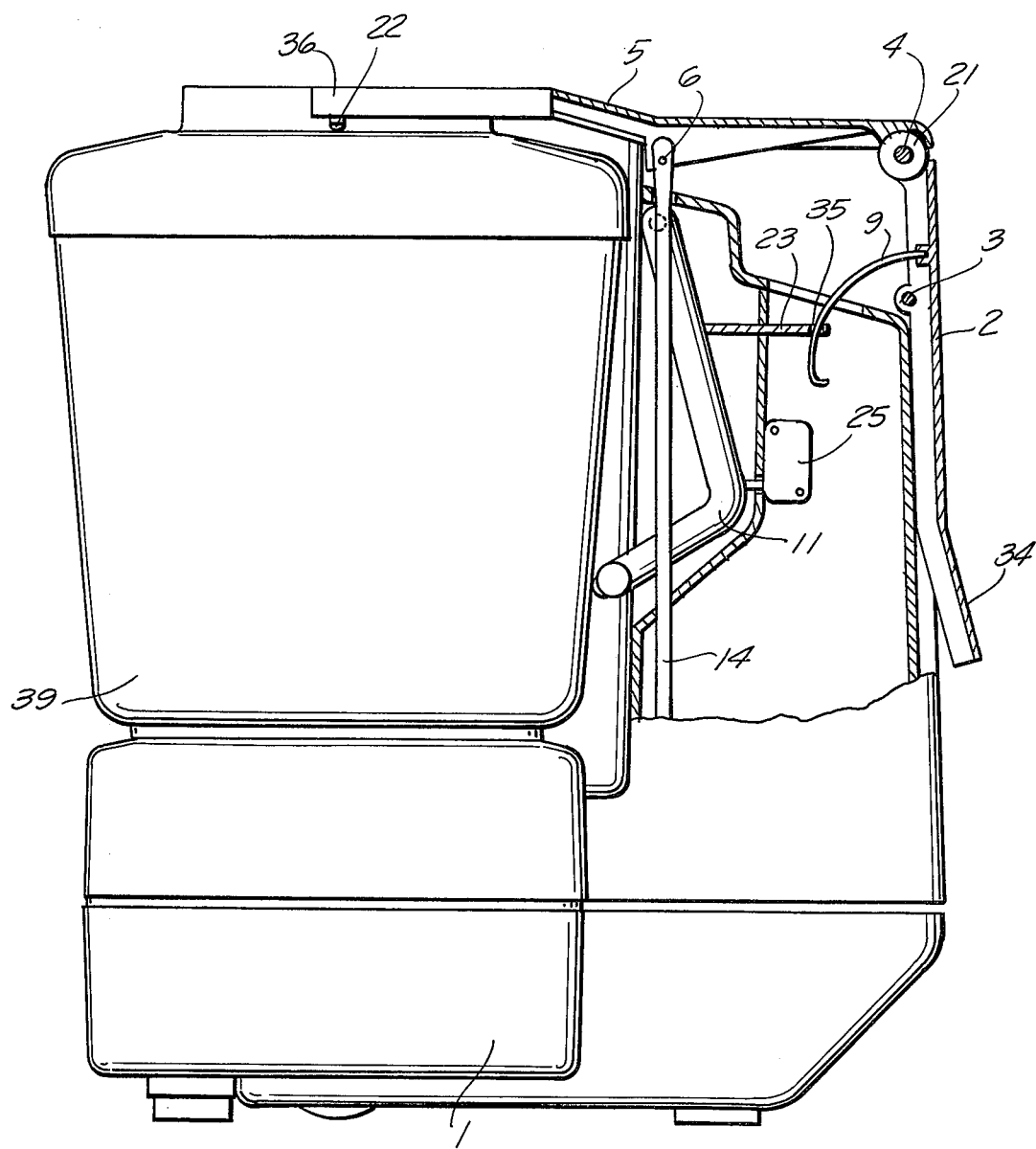
FIG. 3 is a view showing a household mixing apparatus with an additional container which is not to be heated, and with a safety interlock device whose arm carrying a temperature sensing element is blocked in an inoperative position.

If it is necessary to use an additional container 39 which for instance is suitable only for a mixing process, it must be assured that the heating device 24 will not be switched on. This can be done as shown in FIG. 3. An additional safety switch 25 is arranged in the housing 1 and operatively connected with the heating device 24. Because the additional container 39 is so constructed that its diameter is greater than the diameter of the container 10 shown in FIGS. 1 and 2, the arm 11 guided by the force transmission element 9 and the guiding member 23 will abut against the additional container 39 in a closed position. Since the additional bowl has a substantially greater diameter the arm 11 is not withdrawn from the housing 1, but the force transmission element 9 is urged by an opposite force through the opening 35, and the arm 11 does not release the safety switch 25. Therefore, the heating device 24 cannot be brought into operation.

Figure 4:
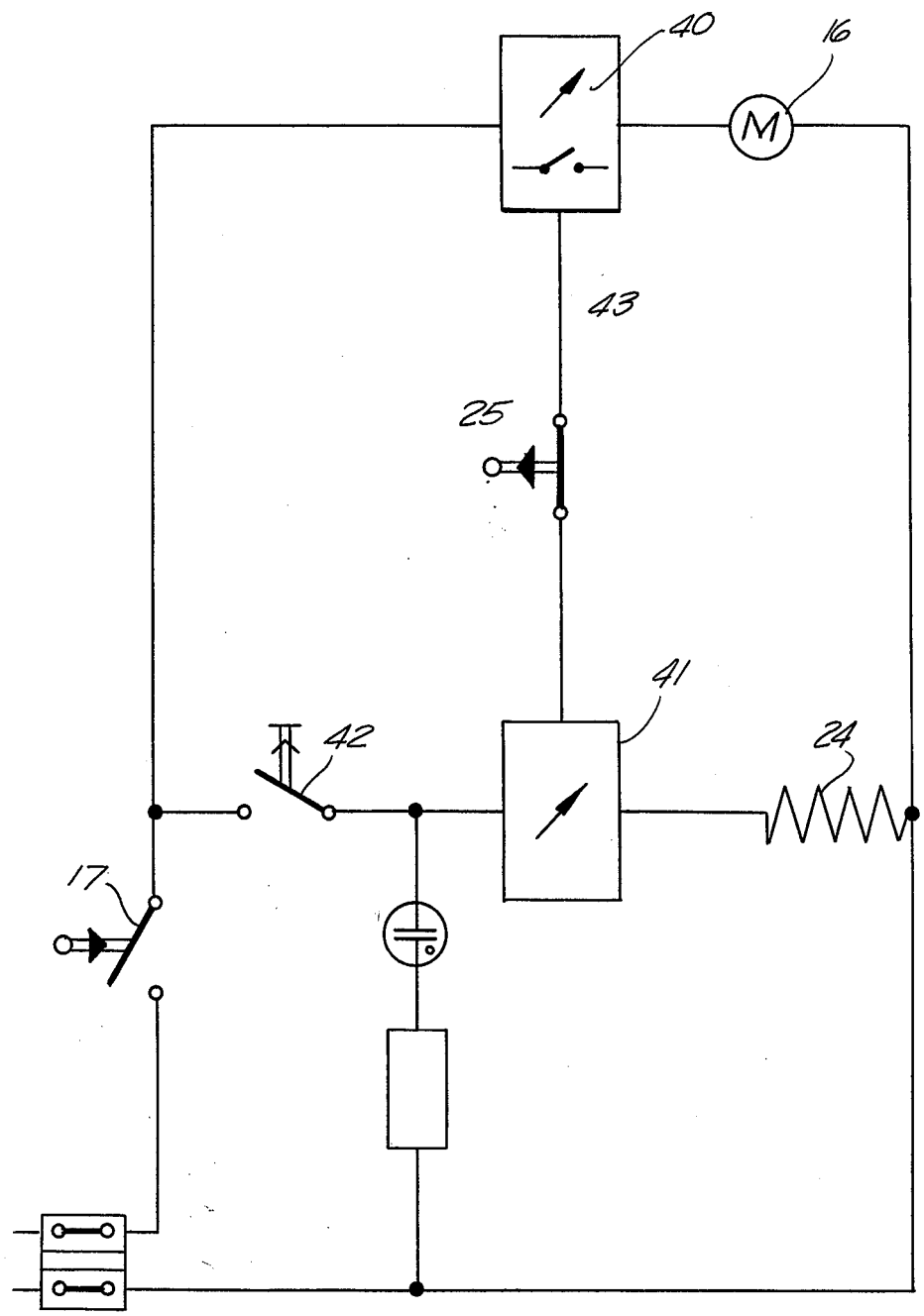
FIG. 4 is a view showing an electric circuit for a household mixing apparatus incorporating the inventive interlock.

FIG. 4 shows an electric circuit illustrating an operation of the individual switches.

Current flow can be established only if the off-on switch 17 is closed. The latter is closed only in the case when the cover 8 is set on the container, and closed as described above. Then, the drive motor 16 can be switched on through a speed control element 40 and the speed of the former may be controlled. Then the switching on of the heating device 24 is also possible. The heating device 24 is switched on by time switch contacts 42, and heat intensity of the heating can be controlled by the electric control element 41. A connection line 43 is provided between the speed control element 40 and the electric control element 41, and the safety switch 25 is arranged in the connection line 43. The circuitry is arranged in such a manner that the heating device can operate, i.e., the current can flow through the electronic control element 41, only in the case when the safety switch 25 is closed and an electric impulse can come from the speed control element 25. Thus, it is possible to heat the substance to be mixed by operation of the drive motor 16.

Furthermore, the heating device 24 will be put out of operation when an additional container, as shown in FIG. 3, is provided, and the arm 11 does not actuate the safety switch 25.

The safety interlock device fixedly connects the cover 8, the container 10 and the housing 1 with each other and prevents switching on of the drive motor 16 in the case when the cover is not set on the container. Moreover, by the inner circuitry heating of the container without operation of the drive motor 16 is prevented. Also, heating the additional container 39 which is not suitable for heating, is prevented.

It will be understood that each of the elements described above, or two or more together, may also find a useful application in other types of constructions, differing from the types described above.

While the invention has been illustrated and described as embodied in a safety interlock device in an electrically driven household mixing apparatus, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In an electrically driven household mixing apparatus having a housing, a drive motor located in the housing and having an electric circuit means for operating the motor, a container including a body portion and a removable cover, and a heating arrangement for heating the container and having a further electric circuit means for sensing and controlling the temperature of the container, a safety interlock device comprising a safety switch operatively connected with said electric circuit means and movable between an on position in which it permits operation of the motor and heating arrangement and an off position in which it does not permit such operation;

a switching rod mounted for longitudinal movement between a switch-on position causing said switch to move to its on position, and a switch-off position causing the switch to move to its off position;

a holding lever pivotally mounted on said switching rod and having an end portion, said holding lever being turnable between a closed position in which said end portion abuts against the cover when the latter is present, and an open position in which said end portion is withdrawn from the cover;

an arm provided with a temperature sensing element operatively connected with the further electrical circuit means of the heating arrangement, and movable between a proximal position in which said temperature sensing element contacts a wall of the container so as to sense the temperature of the latter, and a distal position in which said temperature sensing element is withdrawn from the wall of the container;

an actuating lever mounted for pivotal movement between a first position in which it keeps said holding lever in said closed position and through the intermediary of said holding lever keeps said switching rod in the switch-on position thereof and a second position in which the actuating lever does not keep the holding lever in its closed position and does not keep the switching rod in its switch-off position;

and a transmission element mounted on said actuating lever and operative when the latter is moved to its first position for moving said arm with said sensing element to its proximal position.

2. The device as defined in claim 1, and further comprising a pivot means mounting said actuating arm in said housing for pivotal movement relative to the latter.

3. The device as defined in claim 1, and further comprising a further pivot means mounting said holding lever in said switching rod.

4. The device as defined in claim 3, wherein said switching rod extends from said pivot means to said switch.

5. The device as defined in claim 1, wherein said actuating lever is provided with a loose bearing abutting against said holding lever when said actuating lever is in said first position and said holding lever is said closed position.

6. The device as defined in claim 1, wherein said transmission element is a force transmission element.

7. The device as defined in claim 6, wherein said arm has a guiding portion, said force transmission element abutting against said guiding portion.

8. The device as defined in claim 6, wherein said force transmission element is elongated and elastically deformable in the direction of elongation.

9. The device as defined in claim 1, wherein the container has an axis, said further pivot means and switching rod being movable in the direction of the axis of the container.

10. The device as defined in claim 1, wherein said arm has a tip section, said temperature sensing element being mounted in said tip section of said arm.

11. The device as defined in claim 10, wherein said arm is so formed that said tip section thereof abuts against the wall of the container when said arm is in said proximal position.

12. The device as defined in claim 1, wherein said end portion of said holding lever has an abutment section abutting against the cover of the container when said holding lever is in said closed position.

13. The device as defined in claim 12, wherein said abutment section of said holding lever is provided with a projection.

14. The device as defined in claim 13, wherein the cover of the container has an upper surface extending in a first direction, said forked end portion of said holding lever having two sections spaced from one another in said first direction.

15. The device as defined in claim 1, wherein said holding lever has a further end portion spaced from said one end portion and provided with an indentation.

16. The device as defined in claim 1, wherein said actuating lever is provided with a loose bearing receivable in said indentation of said holding lever when said actuating lever is in said first position and said holding lever is in said closed position.

17. The device as defined in claim 16, wherein said actuating lever has an end portion, said loose bearing being formed as a roller mounted on said end portion of said actuating lever.

18. The device as defined in claim 1, wherein said end portion of said holding lever is forked.

19. The device as defined in claim 1; and further comprising an additional container which is not to be heated and an additional safety switch operatively connected with the electric circuit means of the heating arrangement and actuated by said arm, so that when said temperature sensing element contacts the additional container, said additional safety switch is held by said arm in a position in which it does not permit operation of the heating arrangement.

20. The device as designed in claim 1; and further comprising a guiding member mounted in said housing, said switching rod extending through said guiding member.

21. The device as defined in claim 1, wherein said switching rod has an end portion adjacent to said safety switch; and further comprising a stop member adjacent to said end portion of said switch, and a spring located between said stop member and said guiding member.

22. The device as defined in claim 1, wherein said housing has an inclined section, said holding lever in said open position abutting against said inclined section of the housing.

* * * * *